US009276951B2

(12) United States Patent
Choi et al.

(10) Patent No.: US 9,276,951 B2
(45) Date of Patent: Mar. 1, 2016

(54) SYSTEM AND METHOD FOR DISCOVERING OPTIMAL NETWORK ATTACK PATHS

(71) Applicant: The Boeing Company, Chicago, IL (US)

(72) Inventors: Jai Joon Choi, Sammamish, WA (US); Brian Christopher Grubel, Glen Burnie, MD (US); Dion Stephen David Reid, Grasonville, MD (US)

(73) Assignee: THE BOEING COMPANY, Chicago, IL (US)

( * ) Notice: Subject to any disclaimer, the term of this patent is extended or adjusted under 35 U.S.C. 154(b) by 76 days.

(21) Appl. No.: 13/974,410

(22) Filed: Aug. 23, 2013

(65) Prior Publication Data
US 2015/0058993 A1 Feb. 26, 2015

(51) Int. Cl.
*H04L 29/06* (2006.01)

(52) U.S. Cl.
CPC .................. *H04L 63/1433* (2013.01)

(58) Field of Classification Search
CPC .............. G06F 21/577; H04L 63/1433; H04L 63/1416; H04L 63/20; H04L 63/1408
USPC ............ 726/25; 706/2, 11, 12, 15, 16, 45, 46, 706/47, 48, 52, 54, 55, 62
See application file for complete search history.

(56) References Cited

U.S. PATENT DOCUMENTS

| 6,285,999 | B1 | | 9/2001 | Page |
| 7,526,807 | B2 * | | 4/2009 | Chao et al. ............... 726/23 |
| 8,201,257 | B1 * | | 6/2012 | Andres et al. ............ 726/25 |
| 8,272,061 | B1 * | | 9/2012 | Lotem et al. ............. 726/25 |
| 8,392,997 | B2 * | | 3/2013 | Chen et al. .............. 726/25 |
| 8,438,643 | B2 * | | 5/2013 | Wiemer et al. .......... 726/25 |
| 8,583,583 | B1 | | 11/2013 | Stachnick et al. |
| 2005/0193430 | A1 * | | 9/2005 | Cohen et al. ............. 726/25 |
| 2011/0071969 | A1 * | | 3/2011 | Doctor et al. ............ 706/15 |
| 2013/0219503 | A1 | | 8/2013 | Amnon et al. |

FOREIGN PATENT DOCUMENTS

| WO | WO0159594 A2 | 8/2001 |
| WO | WO 2010042979 A1 * | 4/2010 |

OTHER PUBLICATIONS

Christiley et al.,"Infection in Social Networks: Using Network Analysis to Identify High-Risk Individuals," published by Amerian Journal of Epidemiology, Sep. 2005, pp. 1024-1031.*

(Continued)

*Primary Examiner* — Hadi Armouche
*Assistant Examiner* — Sakinah Taylor
(74) *Attorney, Agent, or Firm* — Yee & Associates, P.C.

(57) ABSTRACT

A computer-implemented method for discovering network attack paths is provided. The method includes a computer generating scoring system results based on analysis of vulnerabilities of nodes in a network configuration. The method also includes the computer applying Bayesian probability to the scoring system results and selected qualitative risk attributes wherein output accounts for dependencies between vulnerabilities of the nodes. The method also includes the computer applying a weighted-average algorithm to the output yielding at least one ranking of nodes in order of likelihood of targeting by an external attacker.

20 Claims, 13 Drawing Sheets

(56) References Cited

OTHER PUBLICATIONS

Chen et al., "Value Driven Security Threat Modeling Based on Attack Path Analysis," Proceedings of the 40th Annual Hawaii International Conference on System Sciences (HICSS 2007), Jan. 2007, 9 pages.
"PageRank," Wikipedia Foundation, Inc., dated Jun. 24, 2013, 18 pages. Accessed Jun. 24, 2013, http://en.wikipedia.org/wiki/PageRank.
"Centrality," Wikipedia Foundation, Inc., dated Jun. 14, 2013, 7 pages. Accessed Jun. 24, 2013, http://en.wikipedia.org/wiki/Centrality.
"Network theory," Wikipedia Foundation, Inc., dated Jun. 17, 2013, 5 pages. Accessed Jun. 24, 2013, http://en.wikipedia.org/wiki/Network_theory#Link_analysis.
"Fitness model (network theory)," Wikipedia Foundation, Inc., dated Dec. 11, 2012, 3 pages. Accessed Jun. 24, 2013, http://en.wikipedia.org/wiki/Fitness_model_%28network_theory%29.
"Erdös—Rényi model," Wikipedia Foundation, Inc., dated May 8, 2013, 6 pages. Accessed Aug. 23, 2013, http://en.wikipedia.org/wiki/Erdos-Renyi_model.
Combined Search and Examination Report, dated Feb. 6, 2015, regarding Application No. GB1414883.7, 6 pages.

* cited by examiner

SYSTEM AND METHOD FOR DISCOVERING OPTIMAL NETWORK ATTACK PATHS

BACKGROUND INFORMATION

1. Field

The present disclosure relates generally to identifying and managing network security vulnerabilities and, in particular, to ranking potential attack paths to networks by likelihood of attack based on probability analysis and consideration of non-quantitative factors.

2. Background

Within an enterprise network, multiple security risks exist that may not be easily understood or prioritized. An enterprise network may include many thousands of network objects or nodes. Nodes, depending on their location in a network and their associated access rights, may present different opportunities for ingress to the network, movement within the network, and access to network and enterprise assets. Because of their number of connections, some nodes may offer broader access into and within a network than other nodes that may be otherwise similar. Two nodes may as standalone or isolated devices be of similar attractiveness and ease of access but may be of very different attractiveness to attackers because of their connections and potential as gateways.

Sophisticated attackers may seek entrance points of enterprise networks that lead to the widest access in the network or lead to the most valuable or most proximate assets. Some attackers may target specific assets accessible in a network. Other attackers may seek access for purely exploratory or destructive purposes without specific targets in mind at the outset.

Of further importance to the magnitude of the risks themselves may be the timing or imminence of outcomes associated with the risks. Some risks may require immediate attention while others may wait. Two risks may be of apparent equal magnitude in terms of the damages suffered if security is breached and attackers are successful. The two risks may also present similar costs to investigate and resolve. However, the two risks may upon analysis be determined not equal based on their different timings. A failure and incurrence of damages or liability may in fact be truly imminent for one risk whereas the same event associated with a second risk similar or identical to the first risk may have a more distant time horizon. Correctly projecting these time horizons may promote an enterprise to better manage such situations presenting similar risks with different time frames.

An enterprise managing a large network may have limited resources with which to manage network security risks. The enterprise may seek to direct its resources to the greatest risks with the most imminent time frame. A large concentration of potential security problems may originate from a relatively small number of sources. A challenge for the enterprise may be to correctly identify the small number of sources as well as identify those sources whose risks are not as great or not as imminent. An enterprise may successfully identify several or more paths of attack into its network but may not have the resource to immediately mitigate all of those paths of attack. Choosing which to mitigate immediately while leaving the other until later may be a critical decision. Security managers seek to direct their resources and effort to mitigation of risks that matter most in their environment.

Security resource management processes are traditionally subjective, manual, time-intensive, and static. Traditional processes do not account for the dynamic nature of adversarial behavior and attack scenarios. Traditional processes may also be ad-hoc in nature. Further, previous practices may not consider dependencies between vulnerabilities. Two risks may appear similar in terms of likelihood of realization and magnitude of consequences. However, realization of a first risk may be contingent upon realization of at least one other risk or event occurring whereas a second risk may be realized without the involvement of outside actors or events and not affected by any other contingencies. Traditional processes may be unable to recognize and take account of such differences.

Traditional processes may also include network monitoring tools that may feature real-time monitoring of network activity. Such real-time monitoring may utilize rule sets and thresholds for determining if a type of network traffic is abnormal or may potentially be a network attack in process. These monitoring tools may mark such potentially dangerous traffic for review by a security analyst.

Existing approaches may also not reflect qualitative factors such as business impact or certification impact of a problem. In addition, some network nodes or objects may have some risk mitigation already in place. Traditional approaches may be unable to recognize risk mitigation already in place. Further, current tools may be limited to recognizing of vulnerabilities based on a certain hardware and software configuration and patch level.

Enterprises routinely take over other enterprises which may require absorbing or integrating the target entity's data processing infrastructure. The target entity's infrastructure may have vulnerabilities that would become part of the acquiring enterprise's infrastructure if not detected and mitigated. Traditional approaches may be limited to performing network configuration scans to determine patching levels, for example, of the target entity's network components. Further, there may be less information available than desired about the target entity's infrastructure. Merging or absorbing an outside infrastructure may introduce new risks to the acquiring enterprise or compound existing risks. Thus, effective new techniques for discovering network attack paths and successfully projecting their likelihood and timing are desirable.

SUMMARY

The illustrative embodiments provide for a computer-implemented method. The method includes a computer generating scoring system results based on analysis of vulnerabilities of nodes in a network configuration. The method also includes the computer applying Bayesian probability to the scoring system results and selected qualitative risk attributes wherein output accounts for dependencies between vulnerabilities of the nodes. The method also includes the computer applying a weighted-average algorithm to the output yielding at least one ranking of nodes in order of likelihood of targeting by an external attacker.

The illustrative embodiments also provide for another computer-implemented method. The method includes a computer accessing a configuration of a network and the computer determining dependencies between security vulnerabilities associated with nodes in the network. The method also includes the computer ranking the security vulnerabilities based on statistical probabilities applied to the dependencies and combined with qualitative attributes associated with nodes in the network. The method also includes the computer applying an ordered weighted average algorithm to the ranked security vulnerabilities. The method also includes the computer determining at least one network attack path based on application of the ordered weighted average algorithm.

The illustrative embodiments also provide a system for discovering network attack paths. The system includes a processor and a memory connected to the processor, the memory storing program code which, when executed by the processor, performs a computer-implemented method. The program code includes program code for performing, using the processor, accessing a configuration of a network and program code for performing, using the processor, determining dependencies between security vulnerabilities associated with nodes in the network. The program code also includes program code for performing, using the processor, ranking the security vulnerabilities based on statistical probabilities applied to the dependencies and combined with qualitative attributes associated with nodes in the network. The program code also includes program code for performing, using the processor, applying an ordered weighted average algorithm to the ranked security vulnerabilities. The program code also includes program code for performing, using the processor, determining at least one network attack path based on application of the ordered weighted average algorithm.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
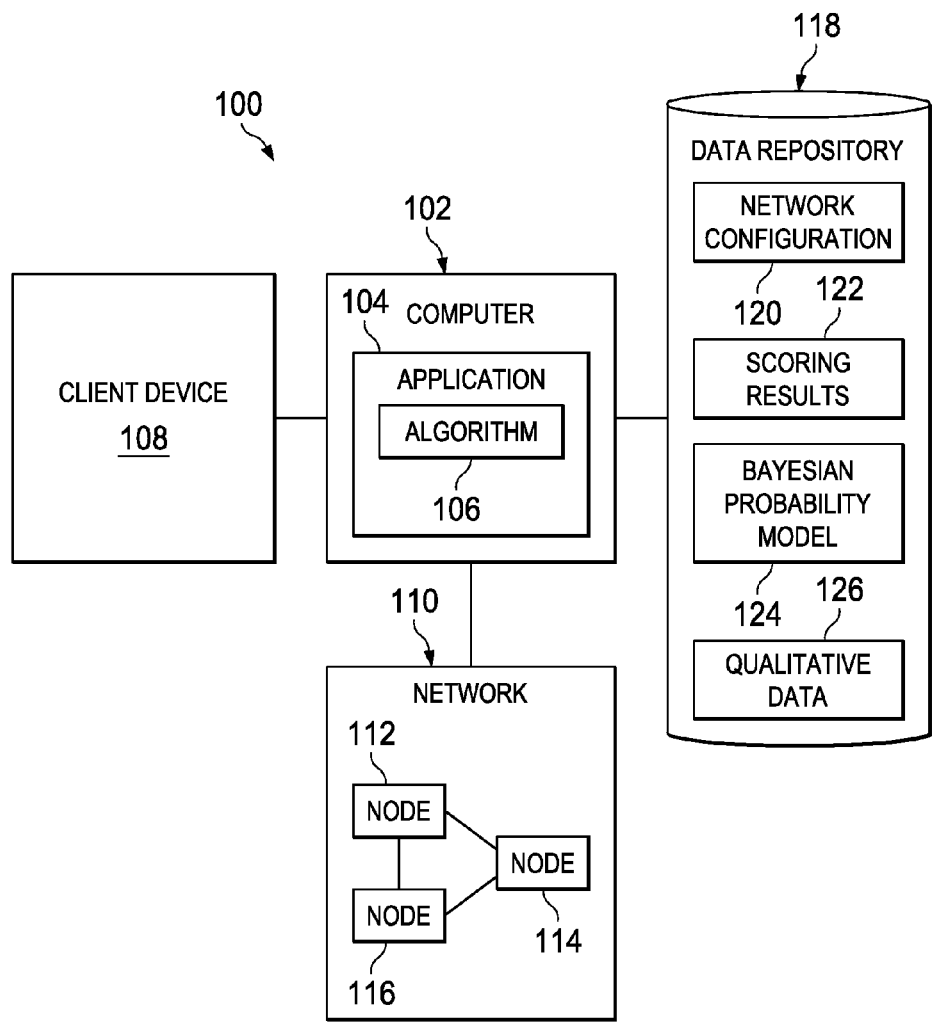
FIG. 1 is a block diagram of a system of discovering optimal network attack paths in accordance with an illustrative embodiment.

The illustrative embodiments recognize and take into account the issues described above with respect to identifying likely network attack paths. Thus, the illustrative embodiments provide a mechanism for determining probabilities of attack paths into a network using known information. At least one weighted average algorithm is provided that processes data from at least a vulnerability scoring system, a probability model, and qualitative data not accounted for by previous embodiments. A risk mitigation framework is provided that utilizes scoring system output, statistical calculations, and qualitative knowledge pertinent to the operating environment of a subject network.

The algorithm may provide an aggregation method for these inputs and may be an ordered weighted average algorithm that determines the least resistant attack path. Output may include a listing of network nodes in their order of vulnerability based on application of the algorithm. To leverage benefits of existing data including the scoring system results, the statistical input, and the qualitative input, the algorithm uses methods employing the at least one weighted average algorithm to determine an aggregated attack path.

The illustrative embodiments provide for determination of an architecture and configuration of a subject network. Comparison against known threats may then take place. Publicly known information-security vulnerabilities and exposures for the particular architecture and configuration are then determined. A scoring system is applied based on a fixed formula for risk assessment. However, this data in its present form may be static and may not account for dynamic nature of attacker behavior.

To address what may be the static nature of the data, the illustrative embodiments provide that a Bayesian network model is then applied. The Bayesian model relies on probability that may require conditional dependency probability tables based on ad hoc knowledge. Dependencies between vulnerabilities are taken into account by Bayesian statistics. The Bayesian model may rely on causal relationships between objects and states that are represented by likelihood probability, which may be ad hoc in nature. But the scoring system results and the Bayesian input may not reflect qualitative data such as business impact and certification impact. Further, the scoring system results and the Bayesian input may not be designed to address missing information.

The illustrative embodiments add qualitative data not previously made part of such analyses. Addition of qualitative data may promote a more nuanced and accurate view of risks faced by a network and may be more realistic based on the psychology of a network attacker. The qualitative data is combined with the scoring system results and input from the Bayesian statistical model. The weighted-average algorithm is then applied to the output of this combination.

While previous implementations may on a real-time basis identify specific ongoing traffic as potentially threatening to a production network, the illustrative embodiments may be useful during a design phase or in addition to such previously implemented behavioral and real-time monitoring systems. While security engineers may leverage such established real-time monitoring tools, they may also need to identify and prioritize network design changes to achieve the most favorable security impact. Such security analysis and planning promoted by illustrative embodiments is by its nature anticipatory and proactive and has not been made available by previous real-time monitoring implementations.

The illustrative embodiments recognize that the algorithm may be an ordered weighted-average algorithm providing an aggregation method to determine at least one least resistant attack path into a network. In order to leverage benefits of existing data, the methods provided by the ordered weighted-average algorithm are used to determine an aggregated attack path. The existing data, including data generated by the static approach of the scoring system, data derived using the Bayesian statistical approach, and domain knowledge generated via the qualitative outcomes, is subjected to the weighted-average algorithm. The algorithm may be based on the use of fuzzy logic and involve steps beginning with definition for fuzzy membership function and creation of fuzzy inference rule set. The input is then "fuzzified" wherein the input is evaluated against membership values. Rules are evaluated and aggregated and the results are "defuzzified" using weighted average method.

Attention is turned to the figures. FIG. 1 is a block diagram of a system 100 of discovering optimal network attack paths in accordance with an illustrative embodiment.

System 100 includes computer 102. Computer 102 may be a general purpose computer. General purpose computers are described with respect to FIG. 19. Application 104 may execute on computer 102. Application 104 combines scoring system results with Bayesian probability input and selected quantitative risk attributes to generate output. Application 104 then applies a weighted-average algorithm 106 to the output wherein nodes in a subject network may be ranked in order of likelihood of attack. While depicted in FIG. 1 as stored in computer 102 and a component of application 104, in an embodiment algorithm 106 may reside and execute partially or fully on another device or on multiple devices.

System 100 also includes client device 108. A user accessing client device 108 may invoke application 104 executing on computer 102 from client device 108. In an embodiment client device 108 and computer 102 may be in a client-server arrangement for at least purposes of the present disclosure. A user of client device 108 may contact computer 102 and cause computer 102 to invoke application 104. In an embodiment, a client portion of application 104 may reside and execute on client device 108 and support the invocation of the components provided herein.

System 100 also includes network 110 that is the subject of operations of application 104. Network 110 may be a voice network, a data network, a combination of voice and data network, or other network. Network 110 may be a private or public local area network (LAN) or wide area network (WAN), may use the Internet Protocol (IP), and may operate fully or partially on the Internet.

While included in system 100 of which computer 102 and application 104 are also components, in an embodiment network 110 and its components have no relationship with computer 102 and application 104 other than to be subjects of examination of computer 102 and application 104 as described herein. In an embodiment network 110 and its components are physically, legally, and otherwise separate and remote from computer 102 and are not contacted by computer 102 or client device 108 for any purpose. In an embodiment, data about network 110 and its components that may be used by computer 102 and application 104 is gathered by a third party separate from operators of both network 110 and computer 102.

System 100 also includes node 112, node 114, and node 116 that are components of network 110. Vulnerabilities of node 112, node 114, and node 116, dependencies between them, and attack paths into network 110 via node 112, node 114, and node 116 may be subjects of interest of computer 102 and application 104. At least one of node 112, node 114, and node 116 may be a potential or real object of attack by a curious or malicious person, organization, or other entity. Other objects or assets directly or indirectly accessible via at least one of node 112, node 114, and node 116 may be the ultimate target of attackers.

Node 112, node 114, and node 116 may be desktop computers, laptop computers, wireless mobile devices, or other devices that are client or server devices wherein network 110 is a client-server network. Node 112, node 114, and node 116 may be other types of devices when network 110 is not a client-server network. Node 112, node 114, and node 116 may be routers or other switching devices, storage devices, printers, or other devices not traditionally associated directly with users or considered computers in network contexts. While an attacker of network 110 and assets accessible via network 110 might logically target devices that are client machines used by users in network 110, in embodiments devices such as routers and switching devices may also present opportunities for attack and ingress to network 110 and beyond to points accessible via network 110.

While node 112, node 114, and node 116 may be viewed as traditional client devices, for example desktop computers, on a network, in an embodiment node 112, node 114, and node 116 may not be hardware components and may instead be software components including software processes. For example, an analysis made possible by the components provided herein may be directed to at least one of the seven layers of the Open Systems Interconnection (OSI) model, a conceptual model that characterizes and standardizes the internal functions of a communication system, for example a data network, by partitioning the communication system into abstraction layers. Attacks may occur at various layers of the OSI model. For example, an attack may be directed to a routing device at layer 2 of the model or an attack may take place on a software protocol, for example the Hypertext Transfer Protocol Secure (HTTPS) protocol at layer 7 of the model. Such layers or software entities may be characterized and approached by illustrative embodiments as sub-entities within a physical node, for example node 112, by drawing a distinction between logical and physical nodes, or in other manners.

System 100 may also include data repository 118 that stores data and other software components used by application 104 to produce rankings of nodes by vulnerability to attack. Data repository 118 may be a relational or other database or may be another type of data storage device or structure.

Data repository 118 includes network configuration 120 that describes information about at least network 110 and its component node 112, node 114, and node 116. Network configuration 120 may be stored in data repository 118 for at least purposes of computer 102 executing application 104 and ranking node 112, node 114, and node 116 in order of likelihood of attack.

Data repository 118 also may include scoring results 122 that are the output of at least one scoring system that assesses the severity of computer system security vulnerabilities. The scoring system may be based on a fixed formula for risk assessment. Scoring results 122 may be the product of operations of the at least one scoring system in examining network configuration 120 describing network 110. Scoring systems may be commercially available software products. In an embodiment, scoring system drawn upon for purposes of receiving scoring result 122 may be the Common Vulnerability Scoring System (CVSS). The Common Vulnerability Scoring System is a free and open industry standard for assessing the severity of vulnerabilities of various systems, including network 110 and its component node 112, node 114, and node 116. The Common Vulnerability Scoring System may establish a measure of how much concern a vulnerability warrants, compared to other vulnerabilities, so efforts to mitigate risks may be prioritized. Scoring results 122 may be based on a series of measurements (called metrics) based on expert assessment.

In producing scoring results 122, the at least one scoring system, for example the publicly available Common Vulnerability Scoring System, may also draw upon information provided by the Common Vulnerabilities and Exposures (CVE) system. The Common Vulnerabilities and Exposures system provides a reference-method for publicly known information regarding security vulnerabilities and exposures. The Common Vulnerabilities and Exposures system defines CVE Identifiers that are unique, common identifiers for publicly known information security vulnerabilities in publicly released software packages. Such publicly released software packages may be used in network 110 and accessed by at least one of node 112, node 114, and node 116. Such publicly released software packages may also be used by other devices or entities accessible via or otherwise associated with network 110. Security vulnerabilities may be detected and assessed by at least one of the scoring system and the Common Vulnerabilities and Exposures system working in combination. Results of the operations of the scoring system and the Common Vulnerabilities and Exposures system may be stored in the data repository 118 as scoring results 122.

System 100 also may include Bayesian probability model 124 that provides probabilities to scoring results 122. Scoring results 122 may provide "flat" data that does not reflect contingencies and relationships between risks bearing on node 112, node 114, and node 116. Bayesian probability model 124 may require conditional dependency probability tables based on ad hoc knowledge. Such knowledge may be about dependencies between risks associated with node 112, node 114, and node 116. Bayesian probability model 124 may rely on causal relationships between objects and states that are represented by a likelihood probability.

An apparently identical risk faced, for example, by node 112 and node 114 may in fact not carry the same weight if the occurrence of an event associated with the risk is based on a contingency that applies to node 112 but not node 114 wherein the contingency bears upon node 116 in some manner. In the example, node 112 and node 116 may have some type of relationship or interdependency such that a risk bearing on node 112 is contingent upon node 116 in some manner. If a first event must occur in association with node 116 in order for a second event to occur to node 112 but the second event can occur to node 114 without contingency, then the absolute weights of the risk of second event to node 112 and node 114 are not the same. Bayesian probability model 124 applies probabilities to risks of vulnerabilities being realized based on dependencies between risks, including multiple dependencies and involvement of more than two of node 112, node 114, and node 116 in the calculation.

System 100 also includes qualitative data 126 that aggregated with the scoring results 122 and the Bayesian probability model 124. Qualitative data 126 may not be considered by previously taught methods or systems for evaluating network attack paths. Qualitative data 126 may include ease of execution, business impact of a risk, downstream impacts, certification impact in the case of aircraft, and existing mitigation already in place for at least one risk.

Qualitative data 126 may include threat evaluation factors such as centrality. Centrality may be expressed in terms of degrees of centrality of at least one node 112, node 114, and node 116 associated with security vulnerabilities. Centrality may include degree centrality including indegree centrality and outdegree centrality. Other factors associated with centrality include betweenness and closeness of node 112, node 114, and node 116 as well as Eigenvector centrality. Systems and methods provided herein account for betweenness centrality of node 112, node 114, and node 116 as a risk factor. Further, clustering, assortativity, distance, and modularity are centrality factors that also may be included in qualitative data 126. Indegree centrality is a count of the number of ties directed to node 112. Outdegree centrality is a number of ties that node 112 directs to others. Betweenness centrality quantifies the number of times node 112 acts as a bridge along the shortest path between two other node 114 and node 116. Assortativity is a preference for at least one of node 112, node 114, and node 116 to attach to other nodes that may be similar in some way. Systems and methods provided herein account for assortative mixing of node 112, node 114, and node 116.

Qualitative data 126 may be subject to analysis and classification before being combined with scoring results 122 and the Bayesian probability model 124 and processed by algorithm 106. Various systems and approaches are available for classifying computer and network security threats. One such system or approach is the STRIDE® approach developed by MICROSOFT®. STRIDE® is an acronym consisting of spoofing of user identity, tampering, repudiation, information disclosure including privacy breach or data leak, denial of service, and elevation of privilege. STRIDE® and other systems and approaches classify qualitative data 126 such that the qualitative data 126 may be combined as taught herein with scoring results 122 and the Bayesian probability model 124 by application 104 applying algorithm 106.

In an embodiment, the accessing of a network configuration and determination of dependencies may be manual processes. The common vulnerabilities and exposures system may be only one source of information about software problems that may affect network security. Such problems may also arise from faulty network design, for example.

Figure 2:
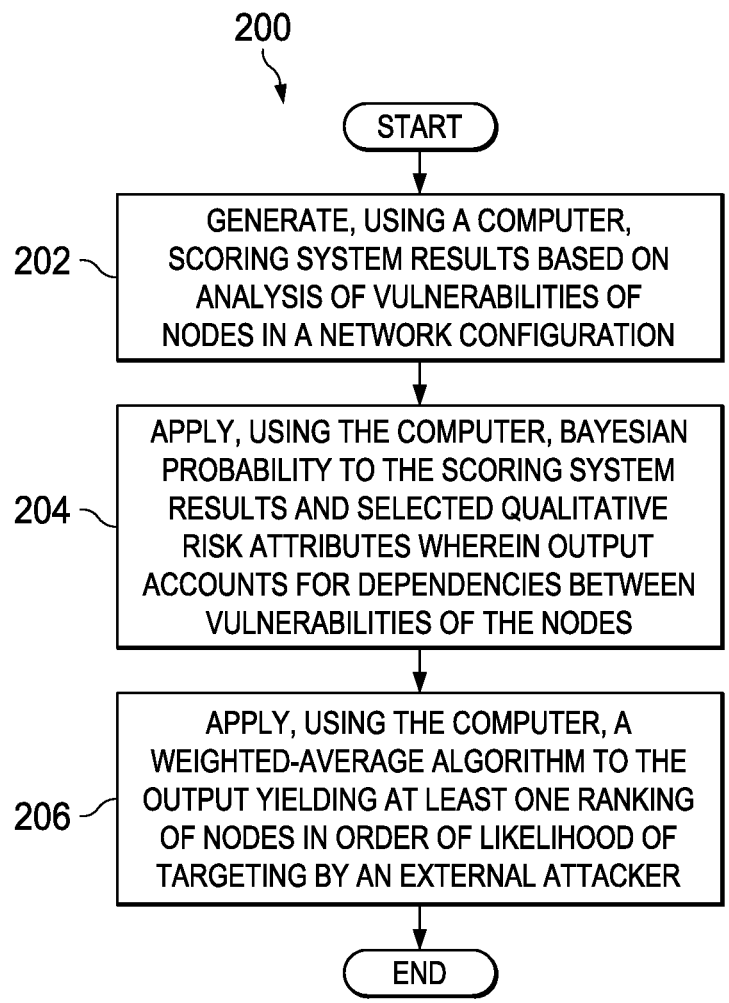
FIG. 2 is a flowchart of a computer-implemented method for discovering network attack paths in accordance with an illustrative embodiment.

FIG. 2 is a flowchart of a computer-implemented method for discovering network attack paths in accordance with an illustrative embodiment. Method 200 shown in FIG. 2 may be implemented using system 100 of FIG. 1. The process shown in FIG. 2 may be implemented by a processor, such as processor unit 1904 of FIG. 19. The process shown in FIG. 2 may be a variation of the techniques described in FIG. 1 and FIG. 3 through FIG. 18. Although the operations presented in FIG. 2 are described as being performed by a "process," the operations are being performed by at least one tangible processor or using one or more physical devices, as described elsewhere herein. The term "process" also may include computer instructions stored on a non-transitory computer readable storage medium.

Method 200 may begin as the process may generate, using a computer, scoring system results based on analysis of vulnerabilities of nodes in a network configuration (operation 202). Next, the process may apply, using the computer, Bayesian probability to the scoring system results and selected qualitative risk attributes wherein output accounts for dependencies between vulnerabilities of the nodes (operation 204). Next, the process may apply, using the computer, a weight-average algorithm to the output yielding at least one ranking of nodes in order of likelihood of targeting by an external attacker (operation 206). Method 200 may terminate thereafter.

Method 200 may be based on a mechanism to determine probabilities of attack paths within networks, for example network 110 provided by system 100. The weighted-average algorithm described in method 200 may prioritize nodes, for example at least one of node 112, node 114, and node 116 provided by system 100, by magnitude of risk and imminence of risk. The scoring system results that may be provided by method 200 may be generated based on a fixed formula for risk assessment. The selected qualitative risk attributes may include at least one of threat type, ease of execution, business risk, and certification risk.

Figure 3:
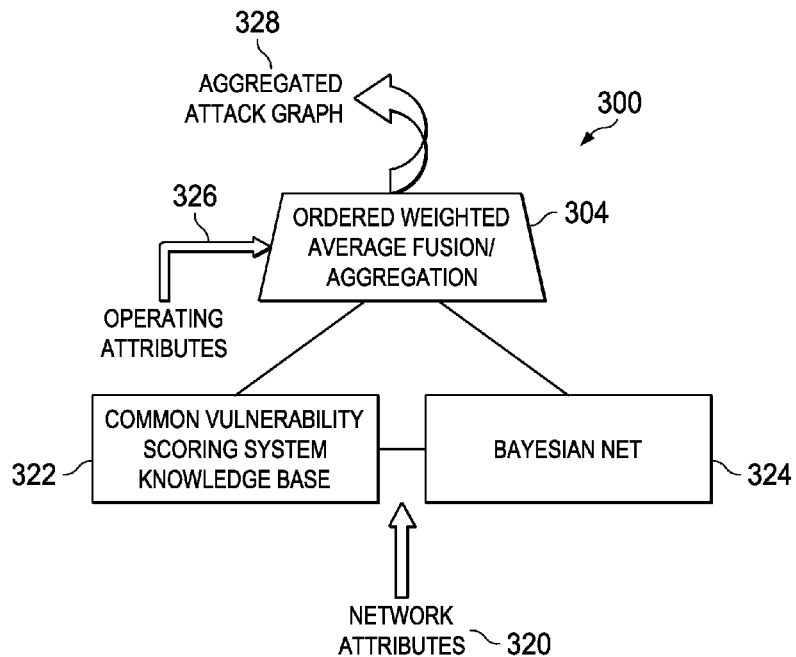
FIG. 3 is diagram of a workflow for discovering network attack paths in accordance with an illustrative embodiment.

FIG. 3 is a diagram of a workflow for discovering network attack paths in accordance with an illustrative embodiment. FIG. 3 depicts a workflow 300 of an illustrative embodiment of the systems and methods provided herein. Components depicted in FIG. 3 may correspond to some components of system 100 depicted in FIG. 1. OWA Fusion/Aggregation 304 may correspond to application 104 of FIG. 1. OWA stands for ordered weighted average. Network attributes 320 may correspond to network configuration 120 of FIG. 1. CVSS Knowledge Base 322 may correspond to scoring results 122 of FIG. 1. Bayesian Net 324 may correspond to Bayesian Probability Model 124 of FIG. 1. Operating attributes 326 may correspond to qualitative data 126 of FIG. 1.

CVSS Knowledge Base 322 may contain scoring results about vulnerabilities of devices or nodes that may described in network attributes 320. Bayesian Net 324 may provide probabilities such that dependencies among risks are considered. Operating attributes 326 may be qualitative factors such as business impact of risks and certification impact of risks when aircraft are involved.

CVSS Knowledge Base 322 may be combined with Bayesian Net 324 and operating attributes 326 in a similar manner as scoring results 122 are combined with Bayesian probability model 124 and qualitative data 126 are combined in system 100. The combination of CVSS Knowledge Base 322 with Bayesian Net 324 and operating attributes 326 is then provided to OWA Fusion/Aggregation 304 wherein risks associated with components of network attributes 320, for example nodes, are ranked in order of their likelihood of attack. The ranking is provided in aggregated attack graph 328.

Figure 4:
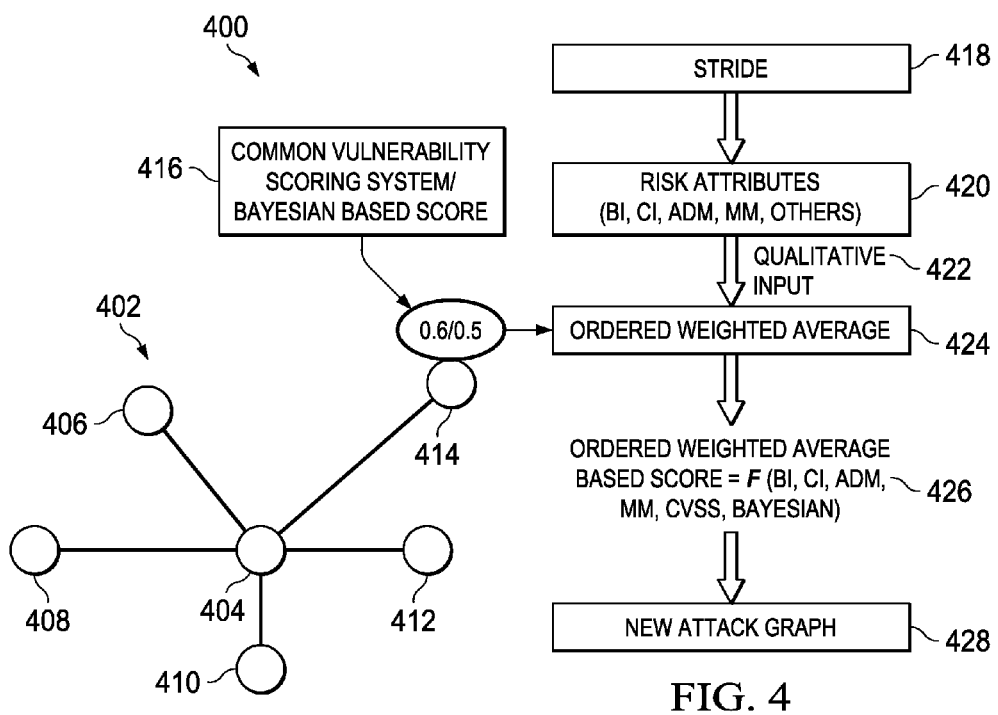
FIG. 4 is a diagram of another workflow for discovering network attack paths in accordance with an illustrative embodiment.

FIG. 4 is a diagram of another workflow for discovering network attack paths in accordance with an illustrative embodiment. FIG. 4 depicts a workflow 400 of an illustrative embodiment of the systems and methods provided herein. FIG. 4 includes network 402 that may correspond to network 110 of FIG. 1.

FIG. 4 also includes node 404, node 406, node 408, node 410, node 412, and node 414 that may be similar to node 112, node 114, and node 116 of FIG. 1. While node 404 in FIG. 4 may appear to be a server or other centralized device to node 406, node 408, node 410, node 412, and node 414, in an embodiment node 404 is not a server and may have some other relationship with node 406, node 408, node 410, node 412, and node 414. FIG. 4 also includes heading entitled CVSS/Bayesian based score 416. Node 414 has a CVSS/Bayesian based score 416 of 0.6/0.5. As noted, CVSS stands for Common Vulnerability Scoring System, an example of a scoring system that may produce scoring results 122 of system 100 and depicted in FIG. 1. The CVSS/Bayesian based score of 0.6/0.5 for node 414 represents a combination of scoring results 122 and measures applied by Bayesian probability model 124 for node 414.

FIG. 4 also includes STRIDE® 418 which is provided as an example of a system for classifying computer and network security threats. STRIDE® 416 processes risk attributes 420. Of risk attributes 420, "BI" stands for business impact, "CI" stands for certification impact in the case of aircraft, "ADM" stands for as designed mitigation, and "MM" stands for mandatory mitigation. Other risk attributes 420 may also be present in an analysis.

Risk attributes 420 may be processed by STRIDE® 418 or similar system as previously described to produce qualitative input 422. Qualitative input 422 may be similar to qualitative data 126 of system 100 and presented in FIG. 1.

Qualitative input 422 and CVSS/Bayesian based score 416 are combined and processed at OWA 424. OWA 424 may correspond to algorithm 106 of system 100 and depicted in FIG. 1. OWA is a description of algorithm 106 that is applied by application 104 of system 100. OWA 424 may combine and process qualitative input 422 and CVSS/Bayesian based score 416 to produce OWA based score 426. OWA based score 426 is expressed in FIG. 4 as a function of business impact, certification impact, as designed mitigation, mandatory mitigation, Common Vulnerability Scoring System (which may be scoring results 122 of FIG. 1), and Bayesian (which may be product of Bayesian probability model 124 of FIG. 1).

FIG. 4 also includes new attack graph 428 which may graphically present output of numerous iterations or cycles of the workflow depicted in FIG. 4. For each of node 404, node 406, node 408, node 410, node 412, and node 414, the workflow depicted in FIG. 4 may calculate likelihood that the particular node will be an object of attack from a person, organization, or other entity. New attack graph 428 may provide rankings of node 404, node 406, node 408, node 410, node 412, and node 414 in order of vulnerability to a possible attack. New attack graph 428 presents output which may promote a security analyst, network manager, or other interested and informed professional to make decisions about risk mitigation action for network 402.

Figure 5:
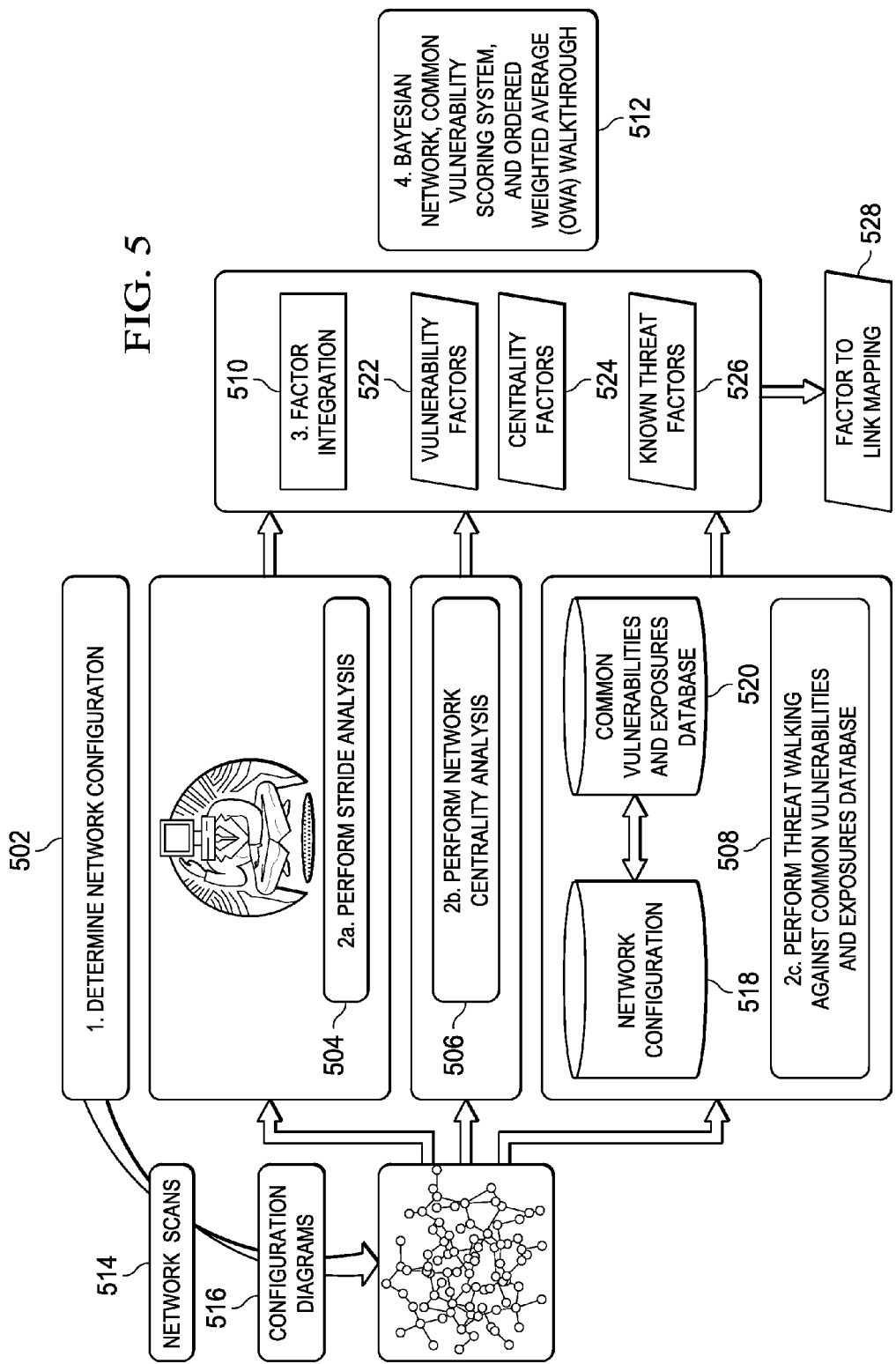
FIG. 5 is a diagram of another workflow for discovering network attack paths in accordance with an illustrative embodiment.

FIG. 5 is a diagram of another workflow for discovering network attack paths in accordance with an illustrative embodiment. FIG. 5 depicts a workflow 500 of an illustrative embodiment of the systems and methods provided herein. FIG. 5 depicts four steps with the second step including three substeps. Workflow 500 steps are 1: Determine Network Configuration 502, 2a: Perform STRIDE® Analysis 504, 2b: Perform Network Centrality Analysis 506, 2c: Perform Threat Walking against CVE Database 508, 3: Factor Integration 510, and 4: Bayesian network, CVSS, and Ordered Weighted Average (OWA) Walkthrough 512.

At 1: Determine Network Configuration 502, network scans 514 and configuration diagrams 516 are gathered. At 2a: Perform STRIDE® Analysis 504, 2b: Perform Network Centrality Analysis 506, 2c: Perform Threat Walking against CVE Database 508, and 3: Factor Integration 510, network scans 514 and configuration diagrams 516 receive processing. At 2a: Perform STRIDE® Analysis 504, network scans 514 and configuration diagrams 516 receive analysis and classification described in the discussion of qualitative data 126 in FIG. 1, for example by the STRIDE® system. At 2b: Perform Network Centrality Analysis 506, network scans 514 and configuration diagrams 516 are subjected to centrality analysis. Centrality analysis examines the extent to which a given node may provide access to other nodes, whether proximate or distant. At 2c: Perform Threat Walking Against CVE Database 508, Network Configuration 518 and CVE DB 520 are compared to determine if any known threats described in the Common Vulnerabilities and Exposures (CVE) system apply to a network configuration being considered. Network Configuration 518 may include some or all of network scans 514 and configuration diagrams 516. As noted, the Common Vulnerabilities and Exposures system provides a reference-method for publicly known information-security vulnerabilities and exposures.

The output of 2a: Perform STRIDE® Analysis 504, 2b: Perform Network Centrality Analysis 506, 2c: Perform Threat Walking Against CVE Database 508 is then sent to 3: Factor Integration 510. At 3. Factor Integration 510, output of 2a: Perform STRIDE® Analysis 504 becomes Vulnerability Factors 522. At 3: Factor Integration 510, output of 2b. Perform Network Centrality Analysis 506 becomes Centrality Factors 524. At 3: Factor Integration 510, output of 2c: Perform Threat Walking Against CVE Database 508 becomes Known Threat Factors 526. 3: Factor Integration 510 includes combining Vulnerability Factors 522, Centrality Factors 524, and Known Threat Factors 526 and sends the combined factors to Factor to Link Mapping 528. At Factor to Link Mapping 528, threat evaluation factors are determined at links between individual nodes. Using components of FIG. 1 for discussion purposes, risks associated with, for example, various factors related to centrality between node 112 and node 114, between node 114 and node 116, and between node 112 and node 116 are determined.

At 4: Bayesian network, CVSS, and Ordered Weighted Average (OWA) Walkthrough 512, output of 3. Factor Integration 510, including Factor to Link Mapping 528, receives final processing by application 104 of FIG. 1 which includes processing by algorithm 106 of FIG. 1. A result of processing at 4: Bayesian network, CVSS, and Ordered Weighted Average (OWA) Walkthrough 512 may be a ranking of nodes or devices by order of vulnerability to attack.

Figure 6:
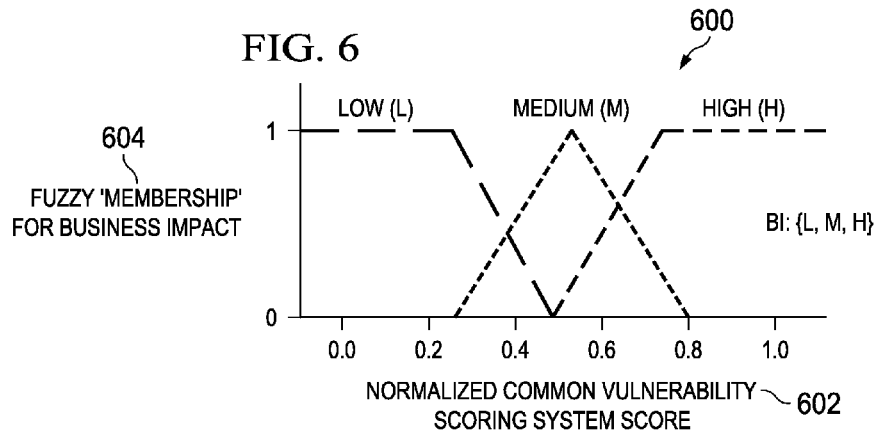
FIG. 6 is a graph of discovering optimal network attack paths according to an illustrative embodiment.

FIG. 6 is a graph of discovering optimal network attack paths according to an illustrative embodiment. Execution of algorithm 106 by application 104 may be accomplished using fuzzy logic. A first step may be to define a fuzzy membership function of attributes against CVSS and Bayesian risk score that may, respectively, be scoring results 122 and Bayesian probability model 124 of FIG. 1. FIG. 6 depicts such definition in graph 600 with Normalized CVSS score 602 on the x axis and Fuzzy 'Membership' for BI 604 on the y axis. Again, "BI" is business intelligence. A Bayesian membership function may be defined similarly.

Figure 7:
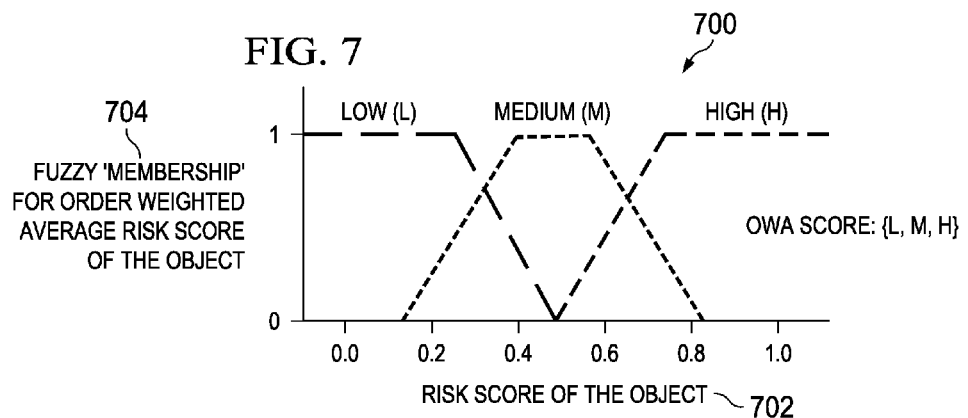
FIG. 7 is another graph of discovering optimal network attack paths according to an illustrative embodiment.

FIG. 7 is an illustration of another graph of discovering optimal network attack paths according to an illustrative embodiment. A second step may be to define fuzzy membership function of the output and ordered weighted average (OWA) risk score. FIG. 7 depicts such definition in graph 700 with Risk score of the object 702 on the x axis and Fuzzy 'Membership' for OWA Risk score of the object 704 on the y axis.

A third step may be to create a fuzzy inference rule set. User-centric fuzzy rules that describe risk knowledge of STRIDE® or other classification system are created. Rules are created using "if, then" logic involving antecedent and consequence. Rules involve elements of qualitative data 126 such as business impact, certification impact, and as designed mitigation. An example of such logic is if business impact is high and certification impact is low and as designed mitigation is none, then risk score of the object is medium. If a given fuzzy rule has multiple antecedents, the fuzzy operator (AND or OR) is used to obtain a single number that represents the result of the antecedent evaluation.

Figure 8:
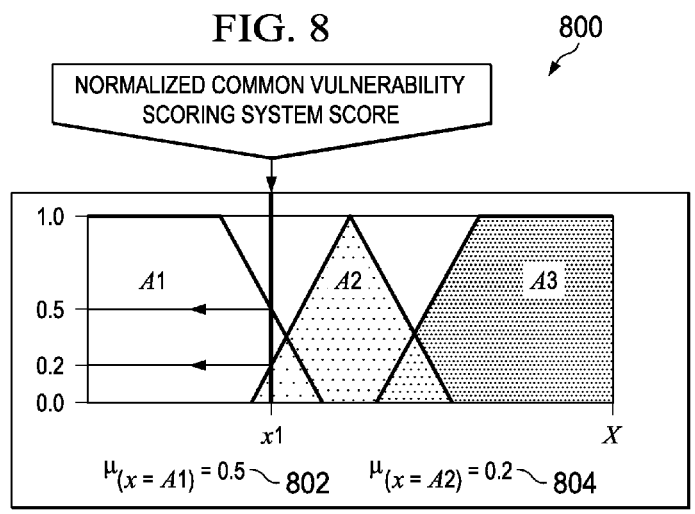
FIG. 8 is another graph of discovering optimal network attack paths according to an illustrative embodiment.

FIG. 8 is another graph of discovering optimal network attack paths according to an illustrative embodiment. A fourth step may be to "fuzzify" the input wherein input is evaluated against the membership value. Formulae for use in fuzzifying an input may be expressed as:

$$\mu_{(x=A1)} = 0.5,$$

$$\mu_{(x=A2)} = 0.2,$$

wherein the formulae are labeled in graph 800 as formula 802 and formula 804, respectively in FIG. 8 In an example, the degree of membership of the input z to the fuzzy member A2 may be 0.2. A crisp input value (a scoring results 122 or score from Bayesian probability model 124) may be obtained and the degree to which the input belong to each of the appropriate fuzzy sets may be determined A next step may be rule evaluation. Each rule may be evaluated using certain inference schemes. When a fuzzy rule has multiple antecedents, the fuzzy operator (AND or OR) may be used to obtain a single number that represents the result of the antecedent evaluation. To evaluate the conjunction of the rule antecedents, the "AND" fuzzy operation intersection may be applied using the following formula:

$$\mu_{A \cap B}(x) = \min[\mu_A(x), \mu_B(x)]$$

However, to evaluate the disjunction of the rule antecedents, the "OR" fuzzy operation may be applied using the following formula:

$$\mu_{A \cup B}(x) = \max[\mu_A(x), \mu_B(x)]$$

Figure 9:
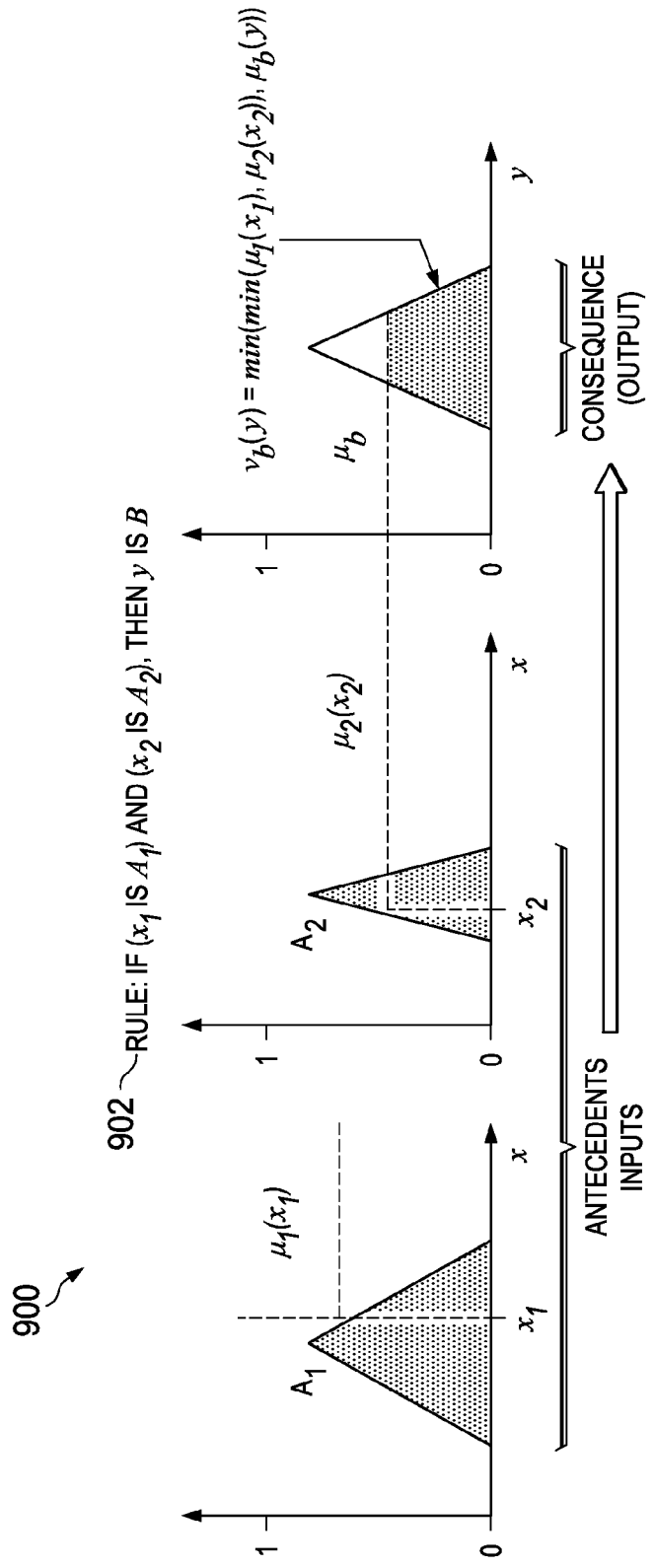
FIG. 9 is another graph of discovering optimal network attack paths according to an illustrative embodiment.

FIG. 9 is another graph of discovering optimal network attack paths according to an illustrative embodiment. Rule 902 is provided above graph 900 in FIG. 9 as an illustration of rule evaluation. The rule evaluation example is depicted involving two antecedents evaluated using a fuzzy "AND" conjunction. In the implication, the antecedent with the least degree of truth prevails. The output fuzzy membership function shown in FIG. 9 may be weighed.

Figure 10:
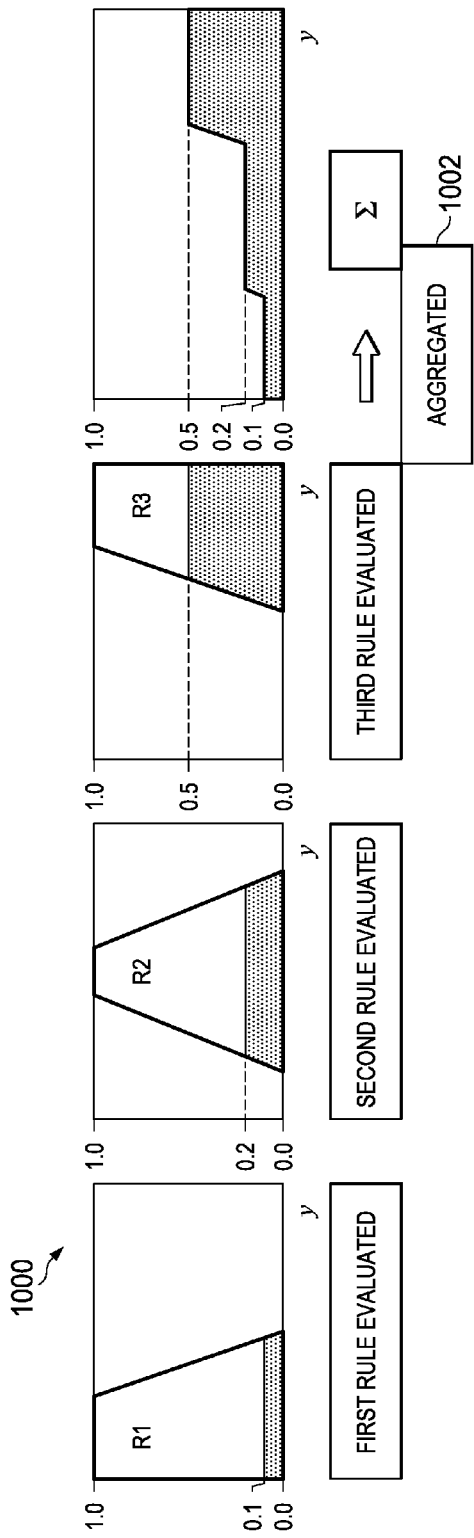
FIG. 10 is another graph of discovering optimal network attack paths according to an illustrative embodiment.

FIG. 10 is another graph of discovering optimal network attack paths according to an illustrative embodiment. The next step may be to aggregate all of the evaluated rules. Aggregation is the process of unification of the outputs of all rules. The membership functions of all rule consequents previously clipped or weighted may be combined into a single set. The input of the aggregation process may be the list of clipped or weighted consequent membership functions. Evaluation of rules is illustrated in FIG. 10 in graph 1000 wherein three rules are aggregated 1002.

Figure 11:
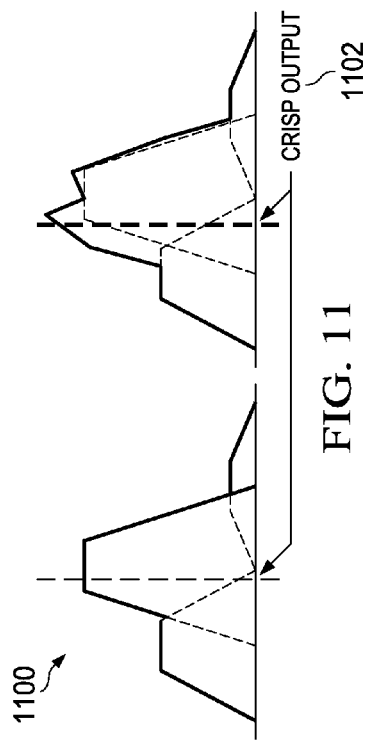
FIG. 11 is another graph of discovering optimal network attack paths according to an illustrative embodiment.

FIG. 11 is another graph of discovering optimal network attack paths according to an illustrative embodiment. The next step may be defuzzification. Defuzzification is a process to obtain a non-fuzzy value that best represents a possibility distribution of an inferred fuzzy aggregation. Selection of a defuzzification procedure may depend on the properties of the application. Methods of defuzzification are further described with respect to FIG. 12, FIG. 13, and FIG. 14. Average or center of gravity of the fuzzy aggregation function may be used. FIG. 11 depicts a graph 1100 demonstrating crisp output 1102 indicating such average or center of gravity. While a fuzzy value may be associated with membership, a crisp value is a numerical value calculated from the aggregated fuzzy value that may be from center of gravity associated with the fuzzy aggregation function.

Figure 12:
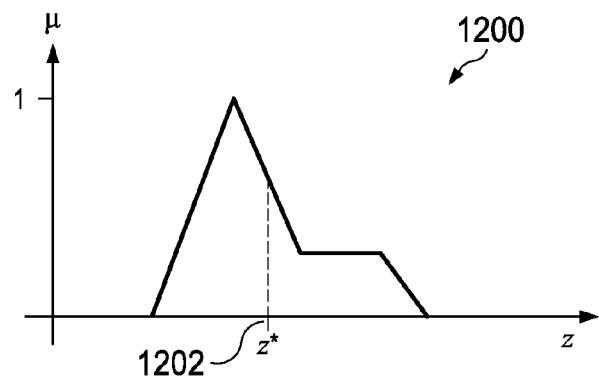
FIG. 12 is another graph of discovering optimal network attack paths according to an illustrative embodiment.

FIG. 12 is another graph of discovering optimal network attack paths according to an illustrative embodiment. FIG. 12 depicts a graph 1200 providing an example of defuzzification. Centroid of gravity (COG) is depicted that may be a prevalent defuzzification method based on the Sugeno method. In FIG. 12, centroid of gravity 1202 is at z* on the axis labeled z. The point z* may be a balancing point of a mass depicted in FIG. 12 and may be referred to as a center of gravity.

Figure 13:
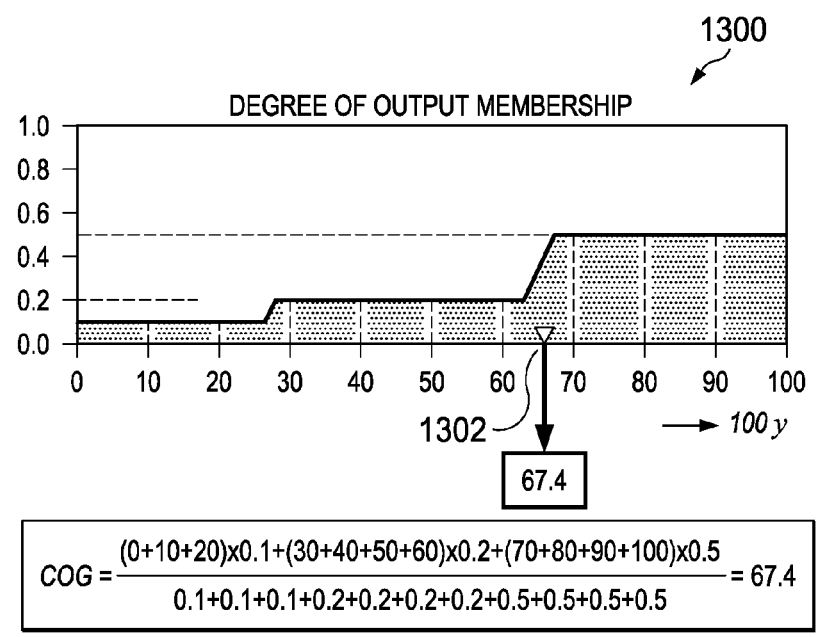
FIG. 13 is another graph of discovering optimal network attack paths according to an illustrative embodiment.

FIG. 13 is another graph of discovering optimal network attack paths according to an illustrative embodiment. FIG. 13 depicts a graph 1300 of another example of defuzzification involving the Sugeno method. The Sugeno method finds a point representing the center of gravity (COG) of the aggregated fuzzy function on the interval [0,1]. A reasonable estimate may be obtained by calculating the estimate over a sample of points. FIG. 13 depicts an example including a formula wherein center of gravity (COG) is calculated at 67.4 and is depicted at on the graph at 1302.

Figure 14:
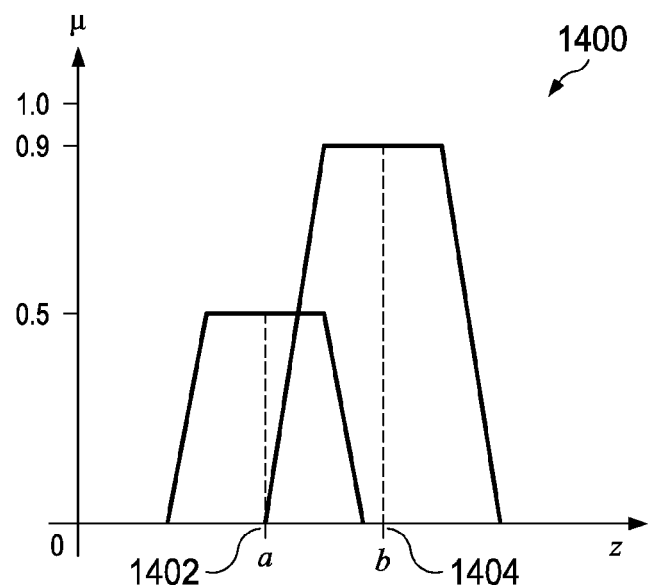
FIG. 14 is another graph of discovering optimal network attack paths according to an illustrative embodiment.

FIG. 14 is another graph of discovering optimal network attack paths according to an illustrative embodiment. FIG. 14 depicts a graph 1400 related to defuzzification and ordered weighted average. This embodiment may be more practical and beneficial for symmetrical output membership functions. This embodiment may produce results close to the center of gravity (COG) with less computational cost. This embodiment may be formed by weighting each function in output by the function's respective maximum membership value. Exemplary functions may be expressed mathematically:

$$z^* = \frac{\Sigma \mu_C(\bar{z}) \cdot \bar{z}}{\Sigma \mu_C(\bar{z})} \quad z^* = \frac{a(.5) + b(.9)}{.5 + .9}$$

In the graph depicted in FIG. 14, two centers of gravity (COG) are indicated at 1402 and 1404.

Figure 15:
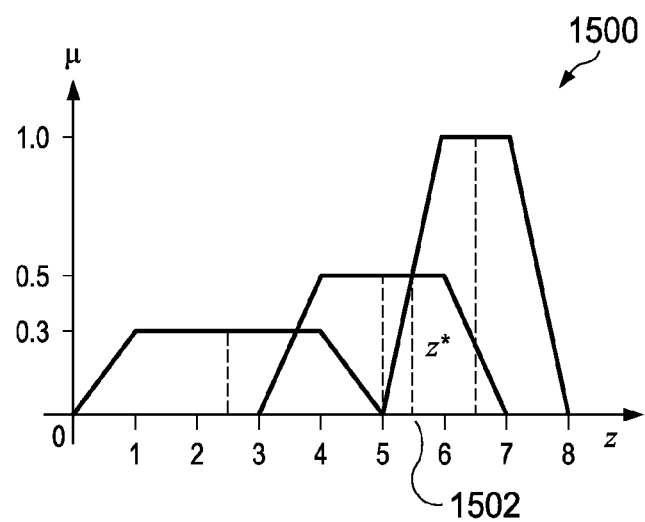
FIG. 15 is another graph of discovering optimal network attack paths according to an illustrative embodiment.

FIG. 15 is another graph of discovering optimal network attack paths according to an illustrative embodiment. FIG. 15 depicts a graph 1500 providing an example of ordered weighted average and provides an example of output value. In FIG. 15, output value is calculated at 5.41 as follows:

$$\text{output value} = \frac{(0.3 \times 2.5) + (0.5 \times 5) + (1.0 \times 6.5)}{0.3 + 0.5 + 1.0} = 5.41$$

In FIG. 15, the calculated output value is indicated at 1502. FIG. 15 may demonstrate how a center of gravity, z*, may be calculated, and which may be an output of the systems and methods provided herein and may further represent a likelihood of a particular attack path. Bayesian probability, output of a system such as Common Vulnerability Scoring System that may be scoring results 122, and the output value z* may be evaluated from aggregated rules, processes included in defuzzification.

Ordered weighted average as provided herein via application 104 and algorithm 106 may feature greater robustness and sensitivity than in previous implementations. A small change in input may not produce a large change in output. Defuzzification methods may result in unique values. Computed output may lie approximately in the middle of a support region and have a high degree of membership. Computational simplicity may also be a benefit. Further, a higher degree of membership may dominate a shape such as depicted in FIG. 15 and may thus influence a final output value.

Figure 16:
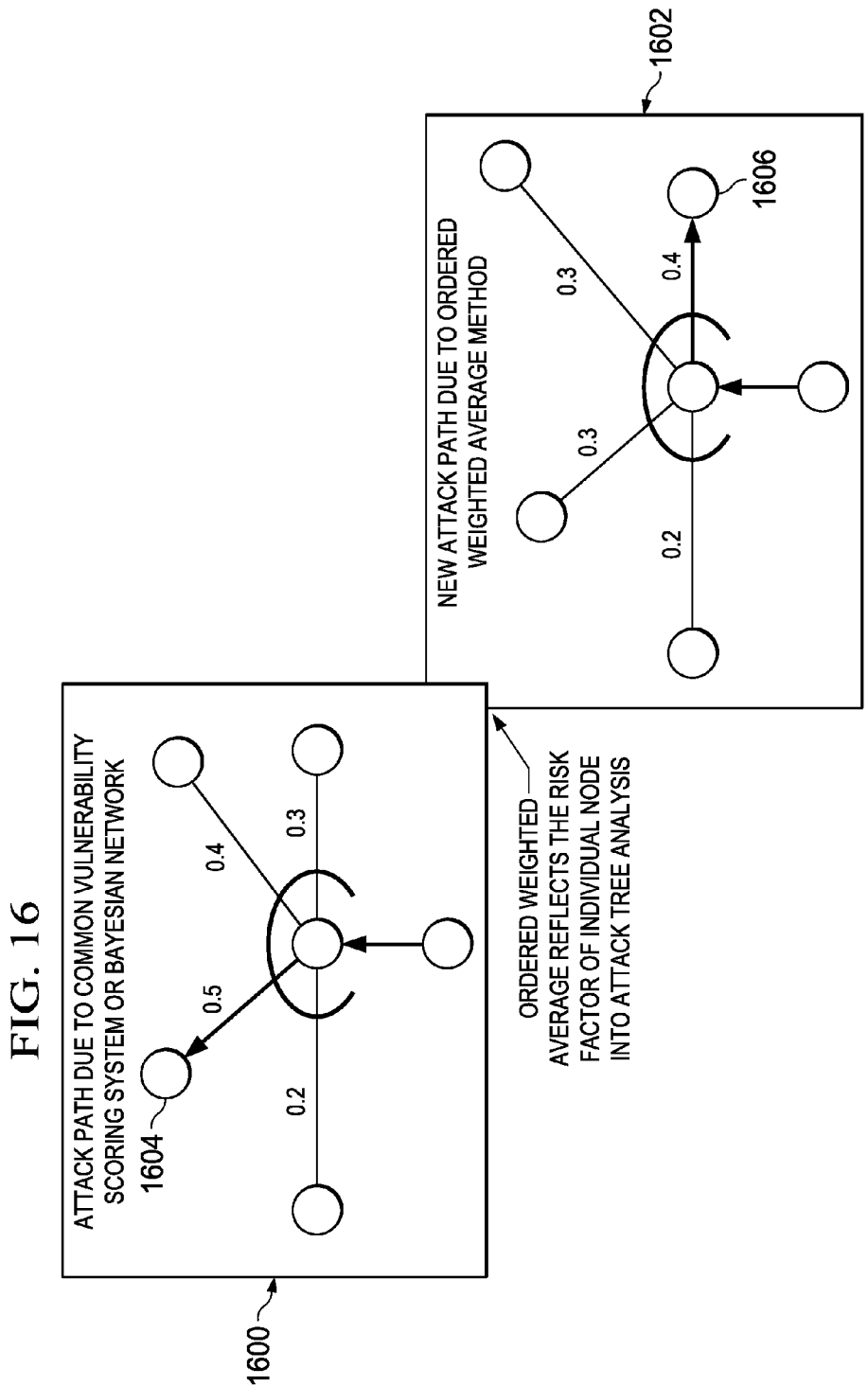
FIG. 16 is a diagram of sample networks according to an illustrative embodiment.

FIG. 16 is a diagram of sample networks according to an illustrative embodiment. FIG. 16 is effectively a before and after view of applying the methods and systems provided herein. FIG. 16 depicts network 1600 in the upper left hand corner of FIG. 16 and depicts network 1602 in the lower right hand corner of FIG. 16. Network 1600 and network 1602 are two depictions of the same network wherein network 1600 has not been subjected to algorithm 106 and network 1602 has been subjected to algorithm 106. Network 1602 features attack path due to CVSS or Bayesian Network wherein the attack path is to node 1604. Network 1602 features New Attack Path due to ordered weighted average method wherein the attack patch is to node 1606. The teachings herein direct attention from node 1604 to node 1606. After applying algorithm 106, a network security analyst would focus on node 1606 instead of node 1604 as node 1606 may be indicated as having greater likelihood of being the target of an attacker.

The present disclosure may also access a Monte Carlo sensitivity analysis option. When factors are calculated for each node 112, node 114, and node 116 and link between node 112, node 114, and node 116 in network 110, there may be ranges of acceptable values based upon confidence in gathered security data. For lower confidence values, ranges on the specific factor that a Monte Carlo algorithm may run through may be higher. After multiple iterations, multiple different probable paths may be found.

Figure 17:
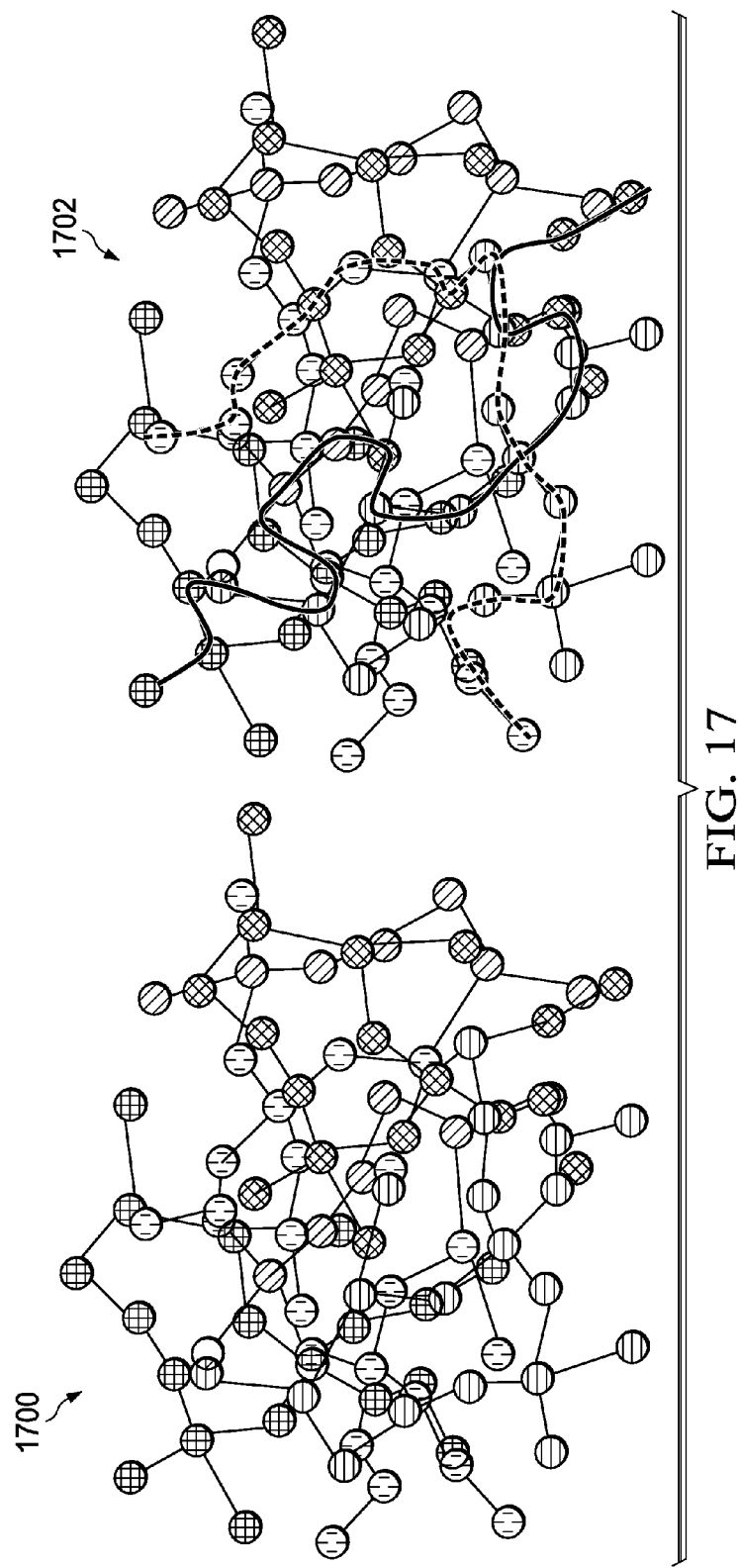
FIG. 17 is a diagram of sample networks according to an illustrative embodiment.

Paths of least resistance may be found through network 110. In an embodiment, heat maps of network 110 may be developed. Three dimensional visualization of attack path probability contours may be promoted. FIG. 17 is a diagram of sample networks according to an illustrative embodiment. FIG. 17 may assist in understanding paths of least resistance. FIG. 17 presents two views of the same network which may be network 110 consisting of many nodes including node 112, node 114, and node 116 of FIG. 1.

FIG. 17 presents view 1700 and view 1702 that may effectively be before and after views of the same network wherein the teachings provided herein are applied. View 1700 provides network 110 without any attack path having been determined. View 1702 provides network 110 with two attack paths shown after algorithm 106 is applied as described herein.

Regarding handling unknown information, when at least one of node 112, node 114, and node 116 is associated with low confidence levels in validity of security information or when no information is available in connection with at least one of node 112, node 114, and node 116, methods provided herein may leverage at least one composite estimate. The at least one composite estimate may be based on an average of other local security elements and similar objects elsewhere in network 110 with similar metadata attributes. These actions may be similar to actions of a finite element analysis (FEA).

When high confidence rests in surrounding objects but low confidence is in an object of interest, perhaps one of node 112, node 114, and node 116 or no information is available, algorithm may assign a value based on average values of the surrounding objects. For example, surrounding objects may have values of either 1 or 2 but the surrounded object of interest may not provide any information. Algorithm 106 may provide a value of 1.5 to the object of interest.

In an alternative method of handling unknown information, instead of examining values of objects surrounding an object of interest, methods provided herein may locate objects elsewhere that are similar in confidence level to the object of interest and use the values of those objects. In contrast to the previous example, instead of using proximity of other objects, methods provided herein seek objects that are similar to the object of interest without regard to proximity of those similar objects.

It may be possible for systems and methods taught herein to use at least one tool that performs real time traffic analysis to develop comparisons against previous predictions. By making such comparisons, systems and methods taught herein may learn from previous predictions. Analysis may be refined to demonstrate attack network graphs predicted by a user versus actual attack network graphs. Further, systems and methods provided herein may be used by at least one ethical hacking organization to support planning of penetration tests and organize exploits.

Figure 18:
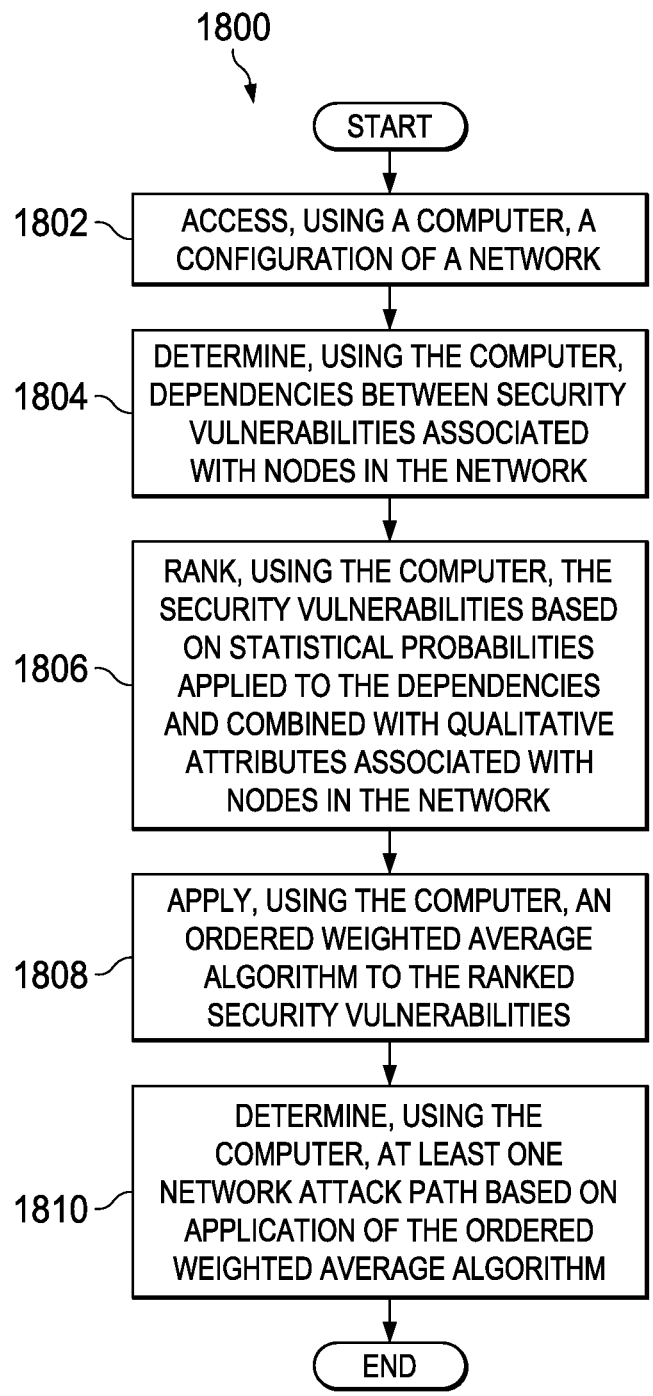
FIG. 18 is a flowchart of a computer-implemented method for discovering network attack paths in accordance with an illustrative embodiment.

FIG. 18 is a flowchart of a computer-implemented method for discovering network attack paths in accordance with an illustrative embodiment. Method 1800 shown in FIG. 18 may be implemented using system 100 of FIG. 1. The process shown in FIG. 18 may be implemented by a processor, such as processor unit 1904 of FIG. 19. The process shown in FIG. 18 may be a variation of the techniques described in FIG. 1 and FIG. 3 through FIG. 17. Although the operations presented in FIG. 18 are described as being performed by a "process," the operations are being performed by at least one tangible processor or using one or more physical devices, as described elsewhere herein. The term "process" also may include computer instructions stored on a non-transitory computer readable storage medium.

Method 1800 may begin as the process may access, using a computer, a configuration of a network (operation 1802). Next, the process may determine, using the computer, dependencies between security vulnerabilities associated with nodes in the network (operation 1804).

Next, the process may rank, using the computer, the security vulnerabilities based on statistical probabilities applied to the dependencies and combined with qualitative attributes associated with nodes in the network (operation 1806). Next, the process may apply, using the computer, an ordered weighted average algorithm to the ranked security vulnerabilities (operation 1808).

Next, the process may determine, using the computer, at least one network attack path based on application of the ordered weighted average algorithm (operation 1810). Method 1800 may terminate thereafter.

The security vulnerabilities described in method 1800 may be determined based on the common vulnerabilities and exposures (CVE) system. Dependencies between security vulnerabilities may be qualified using the common vulnerability scoring system. The statistical probabilities that may be provided by method 1800 may be applied using Bayesian probability techniques. Including the qualitative attributes in the application of the ordered weighted average algorithm may facilitate prioritizing potential network attack paths by imminence of risk.

Figure 19:
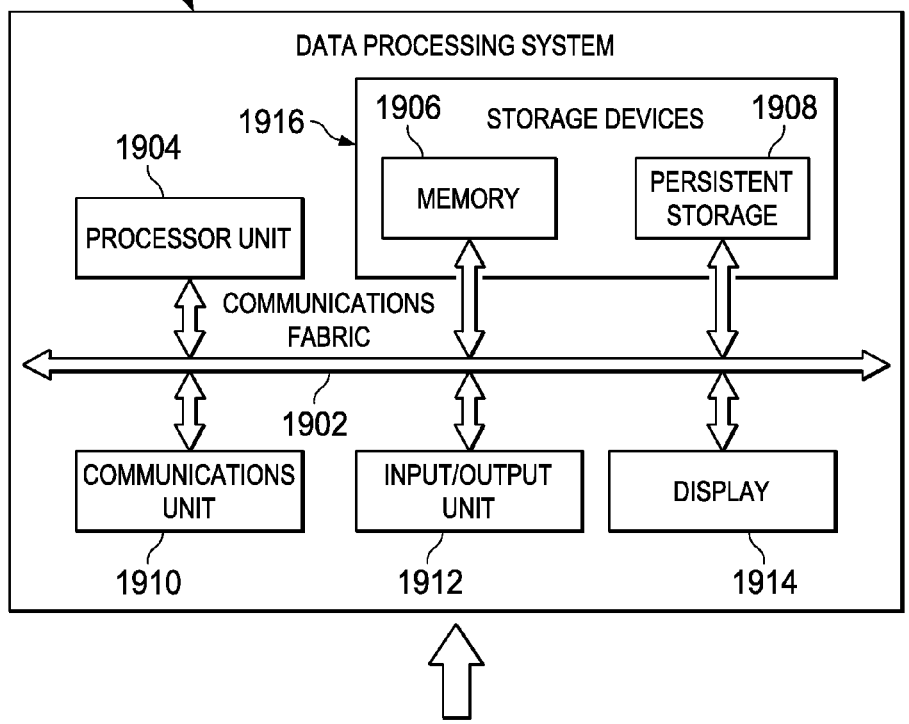
FIG. 19 is an illustration of a data processing system, in accordance with an illustrative embodiment.
Figure 19:
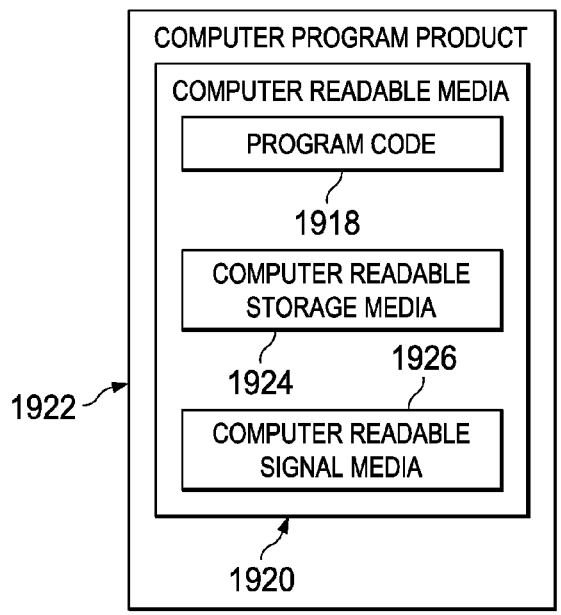

FIG. 19 is an illustration of a data processing system, in accordance with an illustrative embodiment. Data processing system 1900 in FIG. 19 is an example of a data processing system that may be used to implement the illustrative embodiments, such as system 100 of FIG. 1, or any other module or system or process disclosed herein. In this illustrative example, data processing system 1900 includes communications fabric 1902, which provides communications between processor unit 1904, memory 1906, persistent storage 1908, communications unit 1910, input/output (I/O) unit 1912, and display 1914.

Processor unit 1904 serves to execute instructions for software that may be loaded into memory 1906. Processor unit 1904 may be a number of processors, a multi-processor core, or some other type of processor, depending on the particular implementation. A number, as used herein with reference to an item, means one or more items. Further, processor unit 1904 may be implemented using a number of heterogeneous processor systems in which a main processor is present with secondary processors on a single chip. As another illustrative example, processor unit 1904 may be a symmetric multi-processor system containing multiple processors of the same type.

Memory 1906 and persistent storage 1908 are examples of storage devices 1916. A storage device is any piece of hardware that is capable of storing information, such as, for example, without limitation, data, program code in functional form, and/or other suitable information either on a temporary basis and/or a permanent basis. Storage devices 1916 may also be referred to as computer readable storage devices in these examples. Memory 1906, in these examples, may be, for example, a random access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a flash memory, a rewritable optical disk, a rewritable magnetic tape, or some combination of the above. The media used by persistent storage 1908 also may be removable. For example, a removable hard drive may be used for persistent storage 1908.

Communications unit 1910, in these examples, provides for communications with other data processing systems or devices. In these examples, communications unit 1910 is a network interface card. Communications unit 1910 may provide communications through the use of either or both physical and wireless communications links.

Input/output (I/O) unit 1912 allows for input and output of data with other devices that may be connected to data processing system 1900. For example, input/output (I/O) unit 1912 may provide a connection for user input through a keyboard, a mouse, and/or some other suitable input device. Further, input/output (I/O) unit 1912 may send output to a printer. Display 1914 provides a mechanism to display information to a user.

Instructions for the operating system, applications, and/or programs may be located in storage devices 1916, which are in communication with processor unit 1904 through communications fabric 1902. In these illustrative examples, the instructions are in a functional form on persistent storage 1908. These instructions may be loaded into memory 1906 for execution by processor unit 1904. The processes of the different embodiments may be performed by processor unit 1904 using computer implemented instructions, which may be located in a memory, such as memory 1906.

These instructions are referred to as program code, computer usable program code, or computer readable program code that may be read and executed by a processor in processor unit 1904. The program code in the different embodiments may be embodied on different physical or computer readable storage media, such as memory 1906 or persistent storage 1908.

Program code 1918 is located in a functional form on computer readable media 1920 that is selectively removable and may be loaded onto or transferred to data processing system 1900 for execution by processor unit 1904. Program code 1918 and computer readable media 1920 form computer program product 1922 in these examples. In one example, computer readable media 1920 may be computer readable storage media 1924 or computer readable signal media 1926. Computer readable storage media 1924 may include, for example, an optical or magnetic disk that is inserted or placed into a drive or other device that is part of persistent storage

1908 for transfer onto a storage device, such as a hard drive, that is part of persistent storage 1908. Computer readable storage media 1924 also may take the form of a persistent storage, such as a hard drive, a thumb drive, or a flash memory, that is connected to data processing system 1900. In some instances, computer readable storage media 1924 may not be removable from data processing system 1900.

Alternatively, program code 1918 may be transferred to data processing system 1900 using computer readable signal media 1926. Computer readable signal media 1926 may be, for example, a propagated data signal containing program code 1918. For example, computer readable signal media 1926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1918 may be downloaded over a network to persistent storage 1908 from another device or data processing system through computer readable signal media 1926 for use within data processing system 1900. For instance, program code stored in a computer readable storage medium in a server data processing system may be downloaded over a network from the server to data processing system 1900. The data processing system providing program code 1918 may be a server computer, a client computer, or some other device capable of storing and transmitting program code 1918.

The different components illustrated for data processing system 1900 are not meant to provide architectural limitations to the manner in which different embodiments may be implemented. The different illustrative embodiments may be implemented in a data processing system including components in addition to or in place of those illustrated for data processing system 1900. Other components shown in FIG. 19 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1904 may take the form of a hardware unit that has circuits that are manufactured or configured for a particular use. This type of hardware may perform operations without needing program code to be loaded into a memory from a storage device to be configured to perform the operations.

For example, when processor unit 1904 takes the form of a hardware unit, processor unit 1904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1918 may be omitted because the processes for the different embodiments are implemented in a hardware unit.

In still another illustrative example, processor unit 1904 may be implemented using a combination of processors found in computers and hardware units. Processor unit 1904 may have a number of hardware units and a number of processors that are configured to run program code 1918. With this depicted example, some of the processes may be implemented in the number of hardware units, while other processes may be implemented in the number of processors.

As another example, a storage device in data processing system 1900 is any hardware apparatus that may store data. Memory 1906, persistent storage 1908, and computer readable media 1920 are examples of storage devices in a tangible form.

In another example, a bus system may be used to implement communications fabric 1902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1905, or a cache, such as found in an interface and memory controller hub that may be present in communications fabric 1902.

Data processing system 1900 may also include at least one associative memory (not shown). Associative memory may be in communication with communications fabric 1902. Associative memory may also be in communication with, or in some illustrative embodiments, be considered part of storage devices 1916.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters. The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for discovering network attack paths comprising:
   generating scoring system results, using a computer, based on analysis of vulnerabilities of nodes in a network configuration, wherein the scoring system results are a quantitative assessment of severities of computer system security vulnerabilities of the nodes in the network;
   applying, using the computer, a Bayesian probability model to the scoring system results to provide probabilities of attack paths into the network, wherein the Bayesian probability model includes conditional dependency probability tables reflecting dependencies between risks associated with different nodes in the network;
   combining, using the computer, qualitative input with both the scoring system results and the probabilities of attack paths, wherein by combining an output is formed, wherein the qualitative input comprises selected qualitative risk attributes that comprise at least one of threat type, ease of execution, business risk, and certification risk;
   accounting, using the computer, for betweenness centrality of nodes as a risk factor, wherein betweeness centrality quantifies a number of times a given node in the network acts as a bridge along a shortest path between two other nodes in the network; and
   accounting, using the computer, for assortativity of nodes, wherein assortativity represents a preference for a given node in the network to attached to other nodes in the network; and
   applying, using the computer, a weighted-average algorithm to the output to yield at least one ranking of nodes in order of likelihood of targeting by an external attacker.

2. The method of claim 1, wherein the weighted-average algorithm prioritizes nodes by magnitude of risk and imminence of risk.

3. The method of claim 1, wherein the scoring system results are further generated based on a fixed formula for risk assessment.

4. The method of claim 1 further comprising:
   using the weighted average algorithm to determine at least one resistant attack path into the network.

5. The method of claim 1 further comprising:
   using the weighted average algorithm to determine at least one optimal attack path into the network.

6. A computer comprising:
   a processor;
   a bus connected to the processor;
   a memory connected to the bus, the memory storing computer usable program code which, when executed by the processor, performs a method for discovering network attack paths, wherein the computer usable program code comprises:
   computer usable program code for generating scoring system results, using the processor, based on analysis of vulnerabilities of nodes in a network configuration, wherein the scoring system results are a quantitative assessment of severities of computer system security vulnerabilities of the nodes in the network;
   computer usable program code for applying, using the processor, a Bayesian probability model to the scoring system results to provide probabilities of attack paths into the network, wherein the Bayesian probability model includes conditional dependency probability tables reflecting dependencies between risks associated with different nodes in the network;
   computer usable program code for combining, using the processor, qualitative input with both the scoring system results and the probabilities of attack paths, wherein by combining an output is formed, wherein the qualitative input comprises selected qualitative risk attributes that comprise at least one of threat type, ease of execution, business risk, and certification risk;
   computer usable program code for accounting, using the computer, for betweenness centrality of nodes as a risk factor, wherein betweeness centrality quantifies a number of times a given node in the network acts as a bridge along a shortest path between two other nodes in the network; and
   computer usable program code for accounting, using the computer, for assortativity of nodes, wherein assortativity represents a preference for a given node in the network to attached to other nodes in the network; and
   computer usable program code for applying, using the processor, a weighted-average algorithm to the output to yield at least one ranking of nodes in order of likelihood of targeting by an external attacker.

7. The computer of claim 6, wherein the weighted-average algorithm is configured to prioritize nodes by magnitude of risk and imminence of risk.

8. The computer of claim 6, wherein the computer usable program code for generating the scoring system results includes a fixed formula for risk assessment.

9. The computer of claim 6 wherein the computer usable program code further includes:
   computer usable program code for using the weighted average algorithm to determine at least one resistant attack path into the network.

10. The computer of claim 6 computer usable program code further includes:

computer usable program code for using the weighted average algorithm to determine at least one optimal attack path into the network.

11. A non-transitory computer readable storage medium storing computer usable program code which, when implemented by a processor, executes a computer-implemented method, the computer usable program code comprising:

computer usable program code for generating scoring system results, using the processor, based on analysis of vulnerabilities of nodes in a network configuration, wherein the scoring system results are a quantitative assessment of severities of computer system security vulnerabilities of the nodes in the network;

computer usable program code for applying, using the processor, a Bayesian probability model to the scoring system results to provide probabilities of attack paths into the network, wherein the Bayesian probability model includes conditional dependency probability tables reflecting dependencies between risks associated with different nodes in the network;

computer usable program code for combining, using the processor, qualitative input with both the scoring system results and the probabilities of attack paths, wherein by combining an output is formed, wherein the qualitative input comprises selected qualitative risk attributes that comprise at least one of threat type, ease of execution, business risk, and certification risk;

computer usable program code for accounting, using the computer, for betweenness centrality of nodes as a risk factor, wherein betweeness centrality quantifies a number of times a given node in the network acts as a bridge along a shortest path between two other nodes in the network; and computer usable program code for accounting, using the computer, for assortativity of nodes, wherein assortativity represents a preference for a given node in the network to attached to other nodes in the network; and computer usable program code for applying, using the processor, a weighted-average algorithm to the output to yield at least one ranking of nodes in order of likelihood of targeting by an external attacker.

12. The non-transitory computer readable storage medium of claim 11, wherein the weighted-average algorithm is configured to prioritize nodes by magnitude of risk and imminence of risk.

13. The non-transitory computer readable storage medium of claim 11, wherein the computer usable program code for generating the scoring system results includes a fixed formula for risk assessment.

14. The non-transitory computer readable storage medium of claim 11 wherein the computer usable program code further includes:

computer usable program code for using the weighted average algorithm to determine at least one resistant attack path into the network.

15. The non-transitory computer readable storage medium of claim 11 wherein the computer usable program code further includes:

computer usable program code for using the weighted average algorithm to determine at least one optimal attack path into the network.

16. The non-transitory computer readable storage medium of claim 11 wherein the computer usable program code further includes:

computer usable program code for analyzing all of: spoofing of user identity; tampering; repudiation; information disclosure including privacy breach or data leak; denial of service; and elevation of privilege.

17. The non-transitory computer readable storage medium of claim 11 wherein the computer usable program code further includes:

computer usable program code for performing threat walking against a common vulnerabilities and exposures database.

18. The computer-implemented method of claim 1 further comprising:

analyzing all of: spoofing of user identity; tampering; repudiation; information disclosure including privacy breach or data leak; denial of service; and elevation of privilege.

19. The computer-implemented method of claim 1 further comprising:

performing threat walking against a common vulnerabilities and exposures database.

20. The computer of claim 6 wherein the computer usable program code further comprises:

computer usable program code for performing threat walking against a common vulnerabilities and exposures database.

* * * * *